US012759396B2

(12) United States Patent
Wang et al.

(10) Patent No.: US 12,759,396 B2
(45) Date of Patent: Oct. 13, 2026

(54) WINDOW GLARE SUPPRESSION SYSTEM

(71) Applicant: GM Global Technology Operations LLC, Detroit, MI (US)

(72) Inventors: Gloria Xinyue Wang, Lemont, IL (US); Chunxi Wang, Lemont, IL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 427 days.

(21) Appl. No.: 18/494,981

(22) Filed: Oct. 26, 2023

(65) Prior Publication Data

US 2025/0135849 A1 May 1, 2025

(51) Int. Cl.

| | |
|---|---|
| ***B60K 35/22*** | (2024.01) |
| ***B60J 3/00*** | (2006.01) |
| ***B60J 3/02*** | (2006.01) |
| ***B60J 3/06*** | (2006.01) |
| ***B60K 35/23*** | (2024.01) |

(52) U.S. Cl.

CPC ............... *B60K 35/22* (2024.01); *B60J 3/007* (2013.01); *B60J 3/02* (2013.01); *B60J 3/06* (2013.01); *B60K 35/23* (2024.01)

(58) Field of Classification Search

CPC .. B60J 3/007; B60J 3/06; B60K 35/22; B60K 35/23; B60K 35/28; B60K 35/29; B60K 35/415; B60K 35/425

USPC ................................................ 296/97.1, 97.3

See application file for complete search history.

(56) References Cited

U.S. PATENT DOCUMENTS

| | | | | |
|---|---|---|---|---|
| 6,572,990 | B1 | 6/2003 | Oyama et al. | |
| 10,036,941 | B2 * | 7/2018 | Takahashi | B60K 35/232 |
| 11,442,316 | B2 * | 9/2022 | Woodgate | G02F 1/133536 |
| 11,892,718 | B2 * | 2/2024 | Woodgate | G02B 6/0076 |
| 12,397,623 | B2 * | 8/2025 | Zhu | B60J 3/06 |
| 2021/0223583 | A1 | 7/2021 | Heber et al. | |
| 2023/0182570 | A1 * | 6/2023 | Janzer | G02B 1/118 359/630 |
| 2023/0254457 | A1 * | 8/2023 | Robinson | G02F 1/1323 349/1 |
| 2024/0142773 | A1 * | 5/2024 | Han | B60K 35/22 |

FOREIGN PATENT DOCUMENTS

| | | | |
|---|---|---|---|
| DE | 2942730 | A1 | 5/1981 |
| DE | 69932594 | T2 | 9/2006 |
| DE | 102009031042 | A1 | 1/2011 |
| DE | 102010019675 | A1 | 11/2011 |
| DE | 102020000347 | A1 | 7/2021 |

OTHER PUBLICATIONS

German Application No. 10 2023 136 405.7 filed Dec. 21, 2023; German Office Action dated Oct. 28, 2024; 3 pages.

* cited by examiner

*Primary Examiner* — Jason S Daniels

(74) *Attorney, Agent, or Firm* — CANTOR COLBURN LLP

(57) ABSTRACT

A vehicle compartment includes a first display configured to irradiate light towards a driver reference position within the vehicle compartment and a first micro-louver structure disposed on the first display configured to reduce an angle range of light from the first display passing therethrough and to irradiate reduced angle light.

20 Claims, 4 Drawing Sheets

WINDOW GLARE SUPPRESSION SYSTEM

INTRODUCTION

The subject disclosure relates to a window glare suppression system for vehicles.

A system for suppressing or preventing window glare seen by the driver of a vehicle is desirable.

SUMMARY

In one exemplary embodiment, a vehicle compartment comprises a first display configured to irradiate light towards a driver reference position within the vehicle compartment, and a first micro-louver structure disposed on the first display configured to reduce an angle range of light from the first display passing therethrough and to irradiate reduced angle light.

In addition to one or more of the features described herein, the first micro-louver structure comprises a first portion configured to irradiate light passing therethrough as light having a first central axis in a first direction, and a second portion that irradiates the light passing therethrough as light having a second central axis in a second direction that is different from the first direction.

In addition to one or more of the features described herein, the first direction is perpendicular to the first display.

In addition to one or more of the features described herein, the second portion of the first micro-louver structure is disposed on an edge of the first display.

In addition to one or more of the features described herein, the first micro-louver structure comprises a third portion that irradiates the light passing therethrough as light having a third central axis in a third direction that is different from the first direction and the second direction.

In addition to one or more of the features described herein, the first portion is disposed at a center of the first display, the second portion of the first micro-louver structure is disposed on an edge of the first display, and the third portion of the first micro-louver structure is disposed between the first portion and the second portion on the first display.

In addition to one or more of the features described herein, the first display is an instrument panel display.

In addition to one or more of the features described herein, the first display is an infotainment system display.

In addition to one or more of the features described herein, the vehicle compartment further comprises a driver side window, wherein the infotainment system display is configured to irradiate light towards both the driver reference position and a passenger reference position within the vehicle compartment, and wherein the first micro-louver structure is structured such that none of the reduced angle light irradiated thereby is incident on the driver side window.

In addition to one or more of the features described herein, the first display includes an instrument panel display and an infotainment system display.

In addition to one or more of the features described herein, the vehicle compartment further comprises a second display, and a second micro-louver structure disposed on the second display configured to reduce an angle range of light from the second display passing therethrough and to irradiate the light as reduced angle light, wherein the reduced angle light irradiated by the first micro-louver structure is narrower than the reduced angle light irradiated by the second micro-louver structure.

In addition to one or more of the features described herein, the first display is an instrument panel display and the second display is an infotainment system display.

In addition to one or more of the features described herein, the vehicle compartment further comprises a polarization structure formed on the first display.

In addition to one or more of the features described herein, the polarization structure transmits horizontally polarized light while restricting vertically polarized light from passing therethrough.

In addition to one or more of the features described herein, the vehicle compartment further comprises a driver side window, and an anti-reflective structure formed on the driver side window.

In addition to one or more of the features described herein, the vehicle compartment further comprises a driver side window, and an anti-reflective structure formed on the driver side window.

In addition to one or more of the features described herein, the vehicle compartment further comprises a driver side window, wherein the first micro-louver structure is structured such that none of the reduced angle light irradiated thereby is incident on the driver side window.

In addition to one or more of the features described herein, the first display is configured to irradiate horizontally polarized light while not irradiating vertically polarized light.

In another exemplary embodiment, a vehicle compartment comprises a display configured to irradiate light towards a driver reference position within the vehicle compartment, and a polarization structure disposed on the display that transmits horizontally polarized light while restricting vertically polarized light from passing therethrough.

In yet another exemplary embodiment, a vehicle comprises a driver seat, a driver side window, an instrument panel display configured to irradiate light towards a driver reference position directly above the driver seat, a first micro-louver structure disposed on the instrument panel display and configured to reduce an angle range of light from the instrument panel display passing therethrough, a first polarization structure disposed on the instrument panel display and configured to transmit horizontally polarized light while restricting vertically polarized light from passing therethrough, an infotainment system display configured to irradiate light towards the driver reference position, a second micro-louver structure disposed on the infotainment system display and configured to reduce an angle range of light from the infotainment system display passing therethrough, a second polarization structure disposed on the infotainment system display and configured to transmit horizontally polarized light while restricting vertically polarized light from passing therethrough, and an anti-reflective structure disposed on the driver side window.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
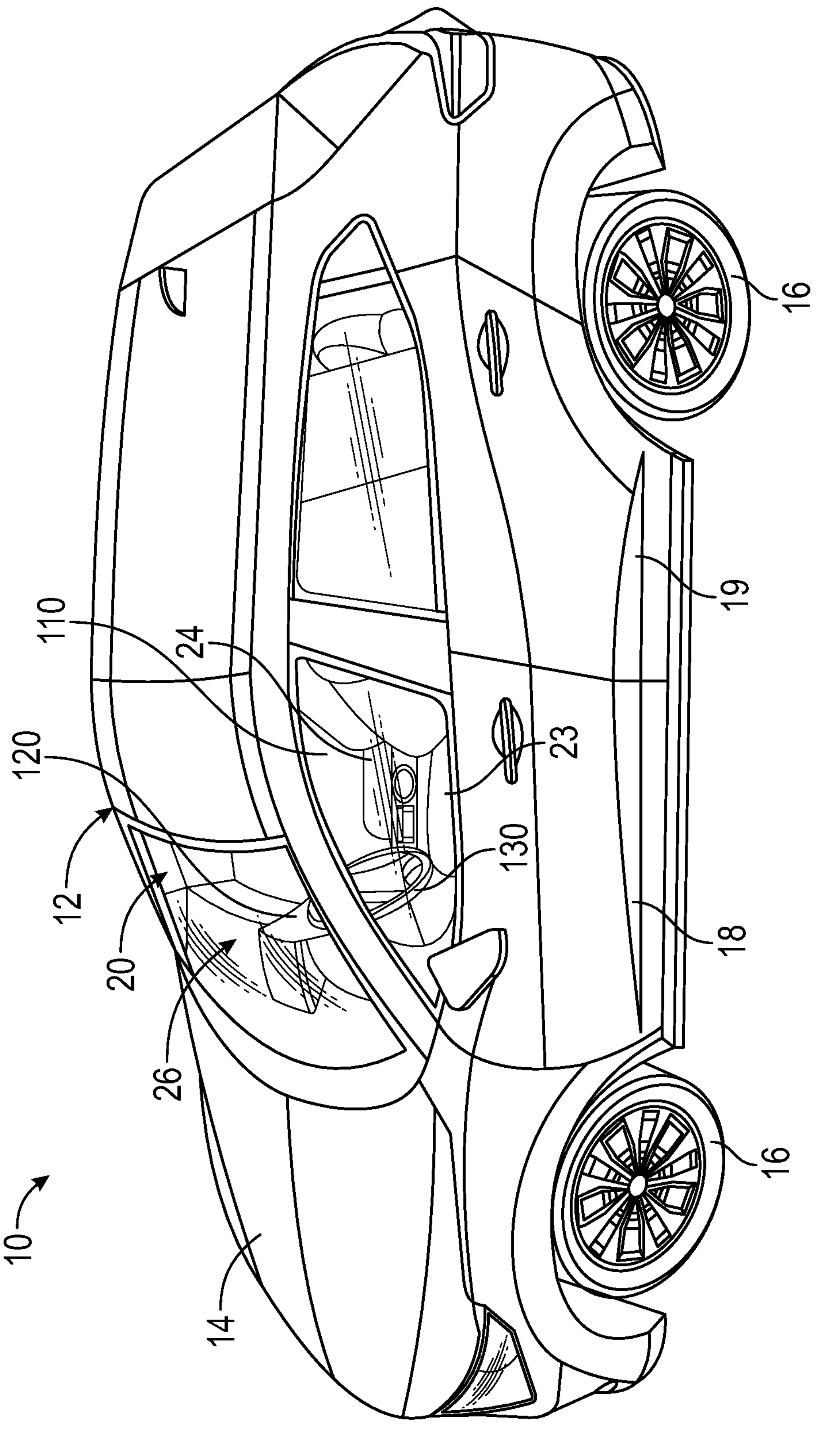
FIG. 1 is a left side view of a vehicle according to a non-limiting example.

The following description is merely exemplary in nature and is not intended to limit the present disclosure, its application or uses. It should be understood that throughout the drawings, corresponding reference numerals indicate like or corresponding parts and features.

FIG. 1 shows a vehicle 10 according to a non-limiting example. The vehicle 10 includes a vehicle body 12 supported on a plurality of wheels 16. One or more of the plurality of wheels 16 is steerable. The vehicle body 12 defines, in part, a passenger compartment 20 having a driver seat 23 and a passenger seat 24 positioned behind a dashboard 26. The dashboard 26 may include an infotainment system display 120 and an instrument panel display 130. An infotainment system display 120 is part of an infotainment system that may provide audio and/or visual entertainment as well as provide information in audio and/or visual form about the vehicle and/or the road. As a non-limiting example, the infotainment system display 120 may provide the visual component of the infotainment system, and may include light source(s) and may be, for example, a liquid crystal display. An instrument panel display 130 is part of an instrument panel system and may provide information in visual and/or audio form about the vehicle and/or the road. The instrument panel display 130 may provide the visual component of the instrument panel system and may include light source(s) and may be, for example, a liquid crystal display. According to a non-limiting example, the infotainment system display 120 and the instrument panel display 130 may be combined into a single display. The vehicle body 12 further defines, in part, a prime mover compartment 14 that houses a prime mover. The prime mover may be, for example, an engine, a motor, or both an engine and a motor in a hybrid configuration. The vehicle body 12 further includes front and rear doors 18, 19. A driver side window 110 is disposed above the driver side front door 18.

Figure 2:
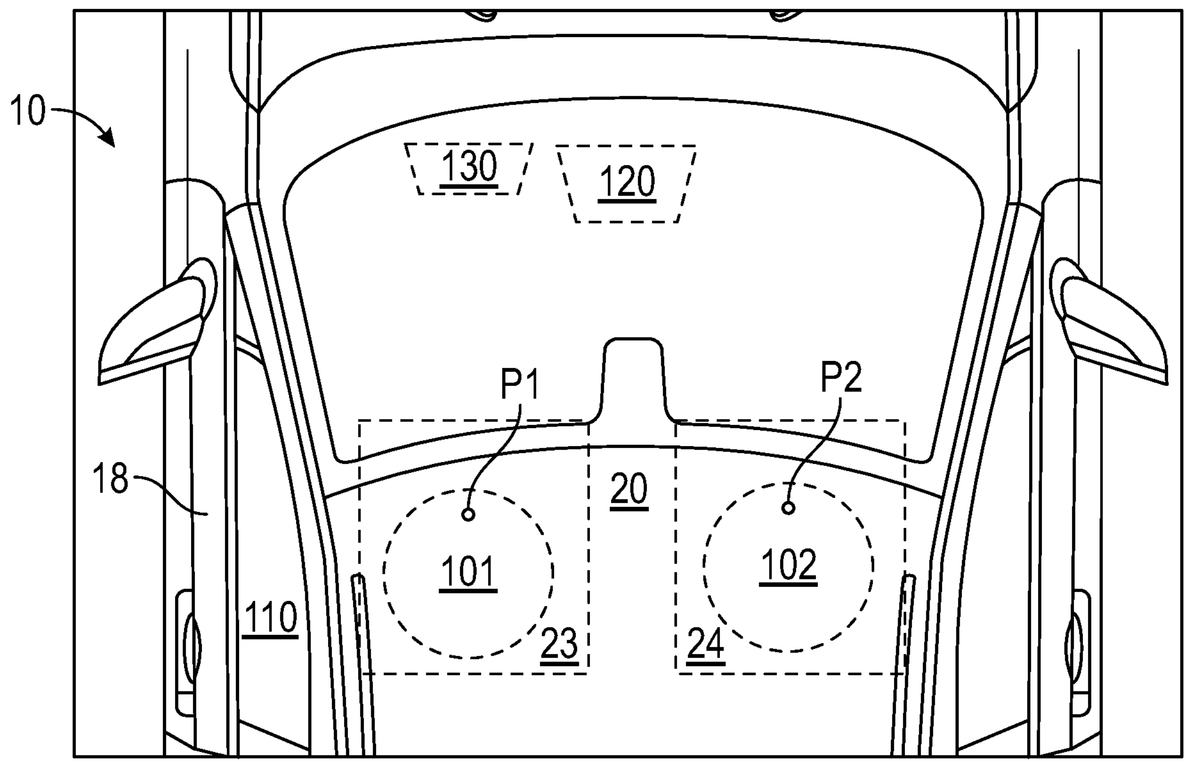
FIG. 2 is a top partial view of a vehicle schematically showing locations of a driver, a passenger, a driver side window, an infotainment system display, and an instrument panel display according to a non-limiting example.
Figure 3:
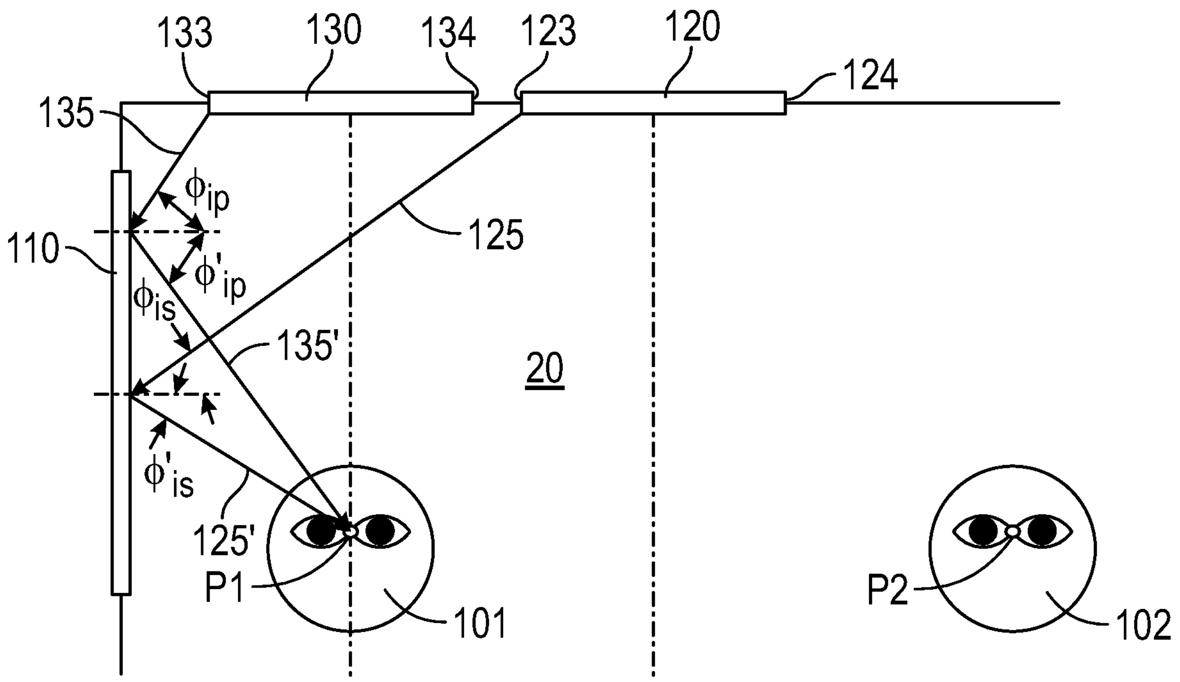
FIG. 3 is a schematic diagram of a passenger compartment according to a non-limiting example.

FIGS. 2 and 3 schematically show a passenger compartment 20 of a vehicle 10 according to a non-limiting example. Specifically, an example of the relative positions of a driver 101, a passenger 102, an infotainment system display 120, and an instrument panel display 130 within the passenger compartment 20 are schematically shown. The infotainment system display 120 may be positioned longitudinally forward of and laterally between the driver 101 and the passenger 102. The instrument panel display 130 may be directly forward of the driver 101. The driver side window 110 is above the driver side front door 18 on a laterally outer side of the driver 101. Further, the passenger compartment 20 includes a driver reference position P1 defined at a position where the eyes of the driver 101 may be positioned, and a passenger reference position P2 defined at a position where the eyes of the passenger 102 may be positioned. According to one or more embodiments, the driver reference position P1 may be defined as the position of the eyes of an averagely-sized driver 101 seated on the driver seat 23, and the passenger reference position P2 may be defined as the position of the eyes of an averagely-sized passenger 102 seated on the passenger seat 24. According to one or more embodiments, the driver reference position P1 is disposed directly above the driver seat 23, and the passenger reference position P2 is disposed directly above the passenger seat 24.

As shown in FIG. 3, the infotainment system display 120 includes a left edge 123 and a right edge 124, and the instrument panel display 130 includes a left edge 133 and a right edge 134.

An infotainment system display 120 and an instrument panel display 130 generally have wide viewing angles so that the driver 101 and the passenger 102 are able to view them from a variety of angles. However, in some vehicles, the wide viewing angles of the infotainment system display 120 and the instrument panel display 130 may result in light therefrom being incident on the driver side window 110 and reflected thereby to the driver 101.

As a non-limiting example, as shown in FIG. 3, a light beam 125 irradiated from near a left edge 123 of the infotainment system display 120 may be incident on the driver side window 110 forming an angle $\Phi_{is}$ with respect to a lateral direction of the vehicle 10. The light beam 125 may be reflected by the driver side window 110 as a reflected light beam 125' forming an angle $\Phi'_{is}$ with respect to the lateral direction of the vehicle 10. According to one or more embodiments, the infotainment system display 120 and the driver side window 110 are substantially perpendicular such that the angles $\Phi_{is}$, $\Phi'_{is}$ are substantially equal. According to one or more embodiments, the infotainment system display 120 and the driver side window 110 are not perpendicular such that the angles $\Phi_{is}$, $\Phi'_{is}$ are different. The reflected light beam 125' may subsequently be incident on the driver reference position P1 such that the driver 101 may see glare in the driver side window 110. While the non-limiting example in FIG. 3 shows the light beam 125 irradiated from near the left edge 123 of the infotainment system display 120 causing glare for the driver 101, light irradiated by different portions of the infotainment system display 120 or an entirety thereof may be reflected by the driver side window 110 and cause glare for the driver 101.

For example, as shown in FIG. 3, a light beam 135 that, in a non-limiting example, is irradiated from near a left edge 133 of the instrument panel display 130 and is incident on the driver side window 110, forming an angle $\Phi_{ip}$ with respect to a lateral direction of the vehicle 10. The light beam 135 is reflected by the driver side window 110 as a reflected light beam 135' forming an angle $\Phi'_{ip}$ with respect to the lateral direction of the vehicle 10. According to one or more embodiments, the instrument panel display 130 and the driver side window 110 are substantially perpendicular such that the angles $\Phi_{ip}$, $\Phi'_{ip}$ are substantially equal. According to one or more embodiments, the instrument panel display 130 and the driver side window 110 are not perpendicular such that the angles $\Phi_{ip}$, $\Phi'_{ip}$ are different. The reflected light beam 135' may subsequently be incident on the driver reference position P1 such that the driver 101 may see glare in the driver side window 110. While the non-limiting example in FIG. 3 shows the light beam 135 irradiated from near the left edge 133 of the instrument panel display 130 causing glare for the driver 101, light from different portions of the instrument panel display 130 or an entirety thereof may be reflected by the driver side window 110 and cause glare for the driver 101.

Figure 4:
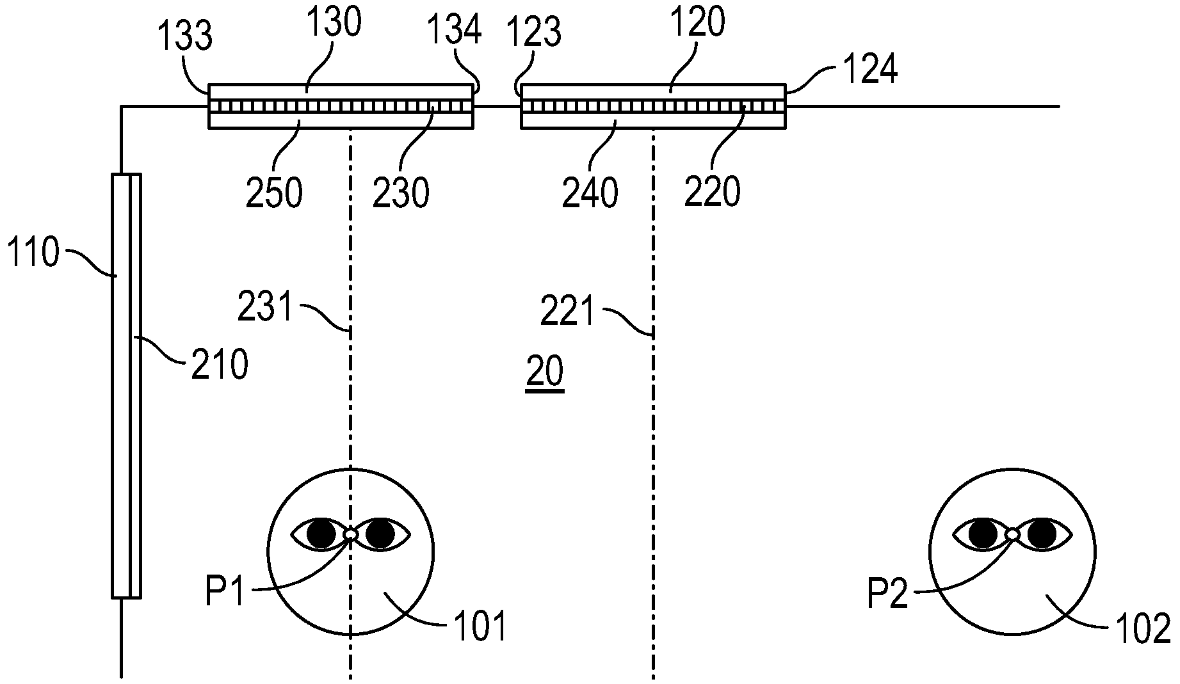
FIG. 4. is a is a schematic diagram of a passenger compartment according to a non-limiting example.

FIG. 4 shows a schematic diagram of a passenger compartment 20 according to a non-limiting example. The passenger compartment 20 is similar to that shown in FIG.

3, but includes a window glare suppression system in the form of a first micro-louver screen 220 formed on the infotainment system display 120, a first polarized screen 240 formed on the first micro-louver screen 220, a second micro-louver screen 230 formed on the instrument panel display 130, a second polarized screen 250 formed on the second micro-louver screen 230, and an anti-reflective coating 210 formed on an inner surface of the driver side window 110. While FIG. 4 shows the window glare suppression system including the anti-reflective coating 210, the first micro-louver screen 220, the second micro-louver screen 230, the first polarized screen 240, and the second polarized screen 250 employed in combination, the present disclosure is not limited thereto. For example, the window glare suppression system may include only one of the anti-reflective coating 210, the first micro-louver screen 220, the second micro-louver screen 230, the first polarized screen 240, and the second polarized screen 250, or any combination of thereof.

The anti-reflective coating 210 is a structure that smooths out the boundary between the air within the passenger compartment 20 and the glass that forms the driver side window 110. This smoothing out of the boundary may reduce reflection by the driver side window 110. Application of the anti-reflective coating 210 to the driver side window 110 may reduce reflection of light from the infotainment system display 120 and/or the instrument panel display 130 which reduces glare for the driver 101. The anti-reflective coating 210 is an example of an anti-reflective structure.

The first polarized screen 240 and the second polarized screen 250 may be formed of polarizing film that restricts the type of wave that can pass therethrough to a specific polarization. According to one or more embodiments, the first polarized screen 240 and the second polarized screen 250 are formed of polarizing film that only allows horizontally polarized light to pass through while restricting vertically polarized light. Horizontally polarized light may be P-polarized when reflected by the window 110, and vertically polarized light may be S-polarized when reflected by the window 110. For air-to-glass reflection, P-polarized light results in low reflection at an angle of incidence under 80 degrees (e.g., 0.2 or lower), and very low reflection at an angle of incidence under 70 degrees (e.g., 0.05 or lower). Further, P-polarized light has significantly less reflection than S-polarized light when the angle of incidence is between approximately 20 degrees and 80 degrees. Thus, light emitted by the infotainment system display 120 and the instrument panel display 130 and polarized by the first polarized screen 240 and the second polarized screen 250 result in significant reductions in reflection at the driver side window 110, in turn reducing glare for the driver 101. Furthermore, a combination of the first polarized screen 240 and/or the second polarized screen 250 with the anti-reflective coating 210 on the driver side window 110 may result in further reduction of glare. The first polarized screen 240 and the second polarized screen 250 are examples of polarizing structures.

According to a non-limiting example, instead of employing a first polarized screen 240 and/or a second polarized screen 250, the infotainment system display 120 and/or the instrument panel display 130 may be liquid crystal displays having horizontal polarization built in. That is, the liquid crystal displays of the infotainment system display 120 and/or the instrument panel display 130 may be structured to only irradiate horizontally polarized light that would result in reduction of glare from the driver side window 110.

Each of the first micro-louver screen 220 and the second micro-louver screen 230 may be formed of a film of shading gridlines that blocks light transmission at a specific range of viewing angles to reduce the viewing angle irradiated therefrom. The viewing angle and orientation of the light irradiated from the first micro-louver screen 220 and the second micro-louver screen 230 may be controlled by spacing and orientation of the shading gridlines. The first micro-louver screen 220 and the second micro-louver screen 230 may be coated or layered on the infotainment system display 120 and the instrument panel display 130. As a non-limiting example, the first micro-louver screen 220 and the second micro-louver screen 230 may be formed of a micro-louver layer that includes multiple shading gridlines shaped as a plurality of small baffles that block outer portions of light in the lateral direction of the vehicle 10, thereby reducing the angle range of light passing therethrough. A plastic or resin layer may be formed on either or both sides of the micro-louver layer with an adhesive layer therebetween. Additionally, a protective layer may be formed as an outermost layer. The first micro-louver screen 220 and the second micro-louver screen 230 are examples of micro-louver structures.

While FIG. 4 shows a first micro-louver screen 220 directly disposed on the infotainment system display 120 and a first polarized screen 240 directly disposed on the first micro-louver screen 220, and a second micro-louver screen 230 directly disposed on the instrument panel display 130 and a second polarized screen 250 directly disposed on the second micro-louver screen 230, the present disclosure is not limited thereto. For example, the first polarized screen 240 may be directly disposed on the infotainment system display 120 and the first micro-louver screen 220 may be directly disposed on the first polarized screen 240, and/or the second polarized screen 250 may be directly disposed on the instrument panel display 130 and the second micro-louver screen 230 may be directly disposed on the second polarized screen 250. As a further example, only the first micro-louver screen 220 or only the first polarized screen 240 may be disposed on the infotainment system display 120, and/or only the second micro-louver screen 230 or only the second polarized screen 250 may be disposed on the instrument panel display 130.

It is noted that, regardless of the order in which the first micro-louver screen 220 and the first polarized screen 240 are disposed on the infotainment system display 120, both the first micro-louver screen 220 and the first polarized screen 240 are considered to be disposed on the infotainment system display 120. Further, regardless of the order in which the second micro-louver screen 230 and the second polarized screen 250 are disposed on the instrument panel display 130, both the second micro-louver screen 230 and the second polarized screen 250 are considered to be disposed on the instrument panel display 130.

Figure 5:
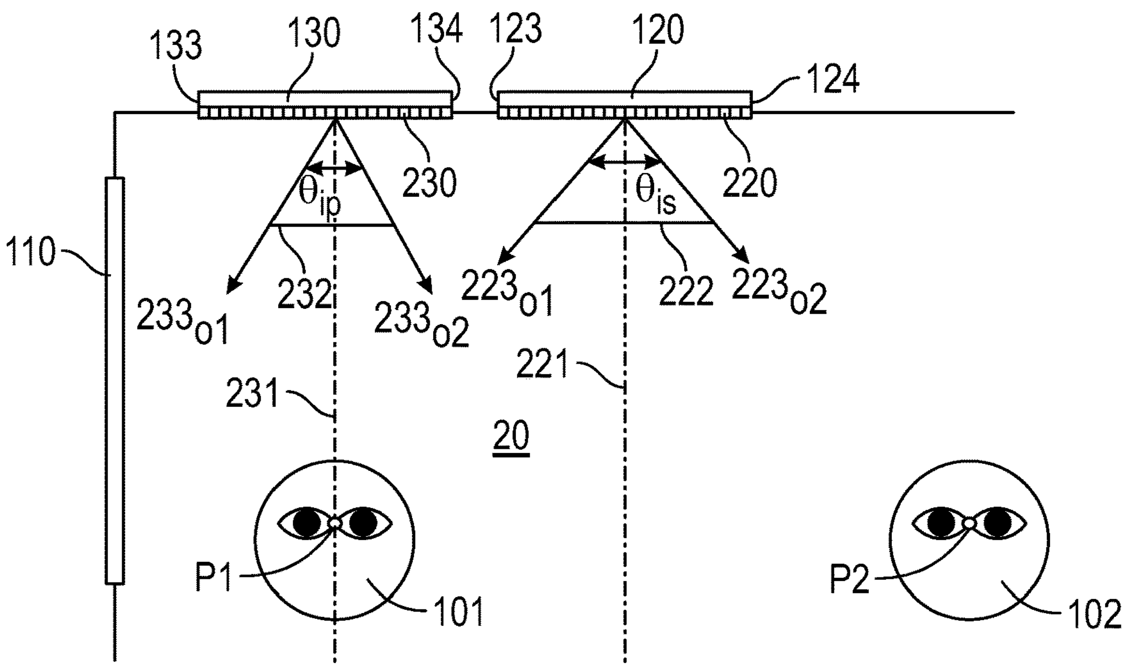
FIG. 5 is a schematic diagram of a passenger compartment according to a non-limiting example.

FIG. 5 shows a schematic diagram of a passenger compartment 20 according to a non-limiting example. Specifically, FIG. 5 shows a non-limiting example of a first micro-louver screen 220 formed on the infotainment system display 120 and a second micro-louver screen 230 formed on the instrument panel display 130.

The infotainment system display 120 and the instrument panel display 130 may be structured to irradiate light at wide angle ranges in the lateral direction of the vehicle 10. The wide angle light from the infotainment system display 120 is incident on the first micro-louver screen 220 which may reduce the viewing angle range in the lateral direction of the vehicle 10 to a reduced angle range $\theta_{is}$ to irradiate reduced angle light 222. The reduced angle range $\theta_{is}$ of the first micro-louver screen 220 may be defined as the angle formed between the outermost light beams 223$_{o1}$, 223$_{o2}$ in the lateral direction of the vehicle 10 and having a central axis 221 at a central position between the outermost light beams 223$_{o1}$, 223$_{o2}$.

The wide angle light from the instrument panel display 130 is incident on the second micro-louver screen 230 which may reduce the viewing angle range in the lateral direction of the vehicle 10 to a reduced angle range $\theta_{ip}$ to irradiate reduced angle light 232. The reduced angle range $\theta_{ip}$ of the second micro-louver screen 230 may be defined as the angle formed between the outermost light beams 233$_{o1}$, 233$_{o2}$ in the lateral direction of the vehicle 10 and having a central axis 231 at a central position between the outermost light beams 233$_{o1}$, 233$_{o2}$.

According to one or more embodiments, the first micro-louver screen 220 and the second micro-louver screen 230 may be structured such that the reduced angle ranges $\theta_{is}$, $\theta_{ip}$ are substantially equal. According to one or more embodiments, the first micro-louver screen 220 and the second micro-louver screen 230 may be structured such that the reduced angle ranges $\theta_{is}$, $\theta_{ip}$ are different. For example, if the infotainment system display 120 is intended to be viewed by both the driver 101 and the passenger 102 while the instrument panel display 130 may be intended to be viewed only by the driver 101, the reduced angle range $\theta_{is}$ may be greater than the reduced angle range $\theta_{ip}$.

According to one or more embodiments, the first micro-louver screen 220 and the second micro-louver screen 230 may be structured to form reduced angle ranges $\theta_{is}$, $\theta_{ip}$ such that a portion of the reduced angle light 232 is incident on the driver reference position P1, and portions the reduced angle light 222 is incident on both the driver reference position P1 and the passenger reference position P2.

According to one or more embodiments, the first micro-louver screen 220 and the second micro-louver screen 230 may be structured to form reduced angle ranges $\theta_{is}$, $\theta_{ip}$ such that substantially all of the reduced angle light 222, 232 are not incident on the driver side window 110 or reflected by the driver side window 110 so as to not be incident on the driver reference position P1.

According to one or more embodiments, the first micro-louver screen 220 and the second micro-louver screen 230 may be structured to form reduced angle ranges $\theta_{is}$, $\theta_{ip}$ such that some of the reduced angle light 222, 232 are not incident on the driver side window 110 or reflected by the driver side window 110 so as to not be incident on the driver reference position P1.

According to one or more embodiments, the first micro-louver screen 220 and the second micro-louver screen 230 may be structured to form reduced angle ranges $\theta_{is}$, $\theta_{ip}$ such that substantially all of the reduced angle light 222, 232 are not incident on the driver side window 110, reflected by the driver side window 110 so as to not be incident on the driver reference position P1 or incident on the driver side window 110 at incidence angles with low reflection.

FIG. 5 shows the first micro-louver screen 220 and the second micro-louver screen 230 being uniformly formed such that the reduced angle light 222, 232 have central axes 221, 231 aligned with a longitudinal axis of the vehicle. However, according to one or more embodiments, the first micro-louver screen 220 and/or the second micro-louver screen 230 may be formed non-uniformly such that at least portions of the first micro-louver screen 220 and/or the second micro-louver screen 230 irradiate reduced angle light 222, 232 having central axes 221, 231 at an angle with the longitudinal axis. The non-uniformity of the first micro-louver screen 220 and/or the second micro-louver screen 230 may occur as variation of the reduced angle ranges $\theta_{is}$, $\theta_{ip}$ across the first micro-louver screen 220 and/or the second micro-louver screen 230, in addition to variation of the central axes 221, 231. Such variations can be continuous across the first micro-louver screen 220 and/or the second micro-louver screen 230. According to one or more embodiments, the reduced angle ranges $\theta_{is}$, $\theta_{ip}$ may correspond to the viewing angles of the first micro-louver screen 220 and/or the second micro-louver screen 230.

Figure 6:
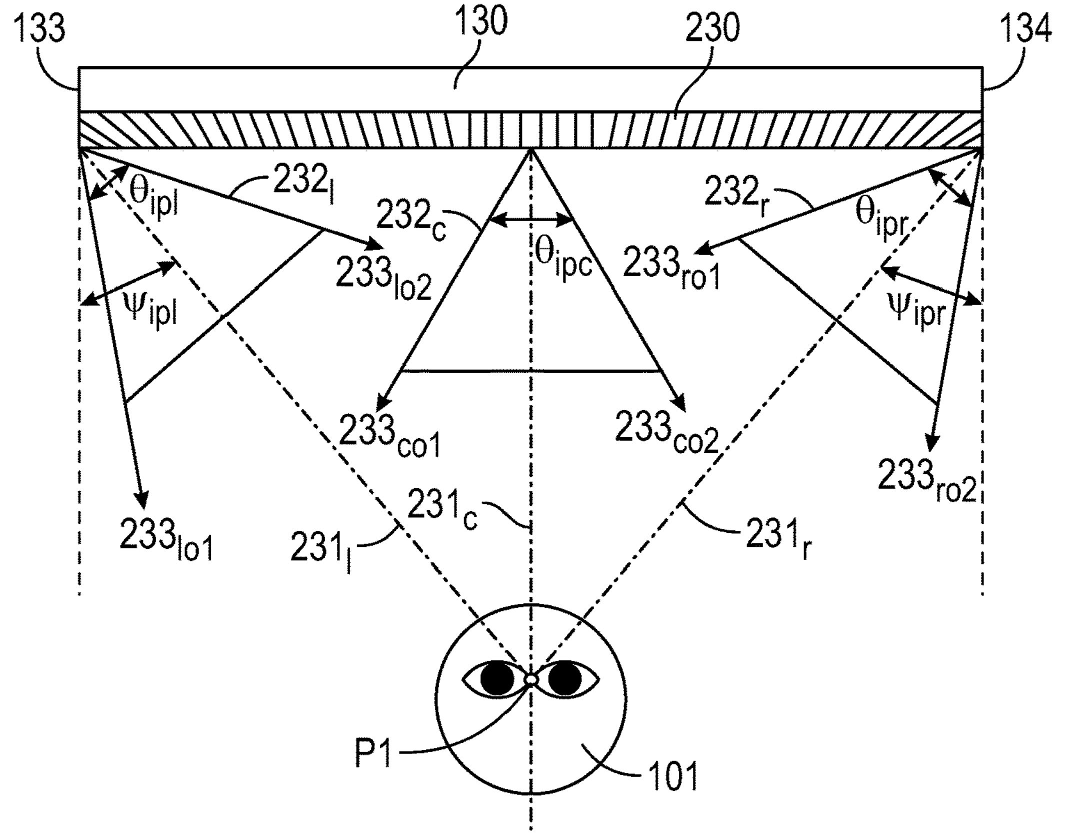
FIG. 6 is a schematic diagram of an instrument panel and a driver according to a non-limiting example.

FIG. 6 shows a non-limiting example of a second micro-louver screen 230 that is a non-uniform structure disposed on the instrument panel display 130. A portion of the second micro-louver screen 230 longitudinally aligned with the driver reference position P1 irradiates reduced angle light 232$_c$ that forms a reduced angle $\theta_{ipc}$ between the outermost light beams 233$_{co1}$, 233$_{co2}$ in the lateral direction of the vehicle 10 and has a central axis 231$_c$ at a central position between the outermost light beams 233$_{co1}$, 233$_{co2}$ aligned with the longitudinal direction of the vehicle 10.

A portion of the second micro-louver screen 230 near the left edge 133 of the instrument panel display 130 irradiates reduced angle light 232$_1$ that forms a reduced angle $\theta_{ip1}$ between the outermost light beams 233$_{lo1}$, 233$_{lo2}$ in the lateral direction of the vehicle 10 and has a central axis 231$_1$ at a central position between the outermost light beams 233$_{lo1}$, 233$_{lo2}$ that forms an angle $\Psi_{ip1}$ with the longitudinal direction of the vehicle 10. As a non-limiting example, the central axis 231$_1$ may overlap the driver reference position P1. According to one or more embodiments, the central axis 231$_1$ may not overlap the driver reference position P1.

As a non-limiting example, the outermost light beam 233$_{lo1}$ may be irradiated in a direction having a lateral component in a direction towards the driver reference position P1. According to one or more embodiments, the outermost light beam 233$_{lo1}$ may be irradiated in the longitudinal direction of the vehicle or in a direction having a lateral component in a direction away from the driver reference position P1.

A portion of the second micro-louver screen 230 near the right edge 134 of the instrument panel display 130 irradiates reduced angle light 232$_r$ that forms a reduced angle $\theta_{ipr}$ between the outermost light beams 233$_{ro1}$, 233$_{ro2}$ in the lateral direction of the vehicle 10 and has a central axis 231$_r$ at a central position between the outermost light beams 233$_{ro1}$, 233$_{ro2}$ that forms an angle $\Psi_{ipr}$ with the longitudinal direction of the vehicle 10. As a non-limiting example, the central axis 231*r* may overlap the driver reference position P1. According to one or more embodiments, the central axis 231$_r$ may not overlap the driver reference position P1.

As a non-limiting example, the outermost light beam 233$_{ro1}$ may be irradiated in a direction having a lateral component in a direction towards the driver reference position P1. According to one or more embodiments, the outermost light beam 233$_{ro1}$ may be irradiated in the longitudinal direction of the vehicle or in a direction having a lateral component in a direction away from the driver reference position P1.

As it may be sufficient for the instrument panel display 130 to be seen by only the driver 101, having the central axes of reduced angle light from the outer portions be angled towards the driver reference position P1 maintains the visual for the driver 101 while suppressing or preventing the reduced angle light from being reflected by the driver side window 110 back towards the driver 101. Thus, glare from the instrument panel display 130 may be suppressed or prevented.

While FIGS. 5-6 show a window glare suppression system with only a first micro-louver screen 220 and a second micro-louver screen 230, the window glare suppression system may also include a first polarized screen 240 formed on the first micro-louver screen 220, a second polarized screen 250 formed on the second micro-louver screen 230, and/or an anti-reflective coating 210 formed on an inner surface of the driver side window 110.

Furthermore, a combination of the first micro-louver screen 220 and the first polarized screen 240 and/or a combination of the second micro-louver screen 230 and the second polarized screen 250 may result in unique, unexpected benefits. While the first micro-louver screen 220 and/or the second micro-louver screen 230 may be employed to reduce the angle range of light irradiated by the infotainment system display 120 and/or the instrument panel display 130 for reducing glare from the driver side window as explained above, too high of an angle reduction may also result in loss of desired viewing angles for the infotainment system display 120 and/or the instrument panel display 130 for the driver 101 and/or the passenger 102. As a non-limiting example, by employing the first polarized screen 240 and/or the second polarized screen 250 to only allow horizontally polarized light pass therethrough, a first micro-louver screen 220 and/or a second micro-louver screen 230 having less reduction in viewing angle can be employed.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle compartment defining a lateral direction, the vehicle compartment comprising:

a first display configured to irradiate light towards a driver reference position within the vehicle compartment;

a first micro-louver structure disposed on the first display configured to reduce, in the lateral direction, an angle range of light from the first display passing therethrough and to irradiate reduced angle light;

a second display; and a second micro-louver structure disposed on the second display configured to reduce, in the lateral direction, an angle range of light from the second display passing therethrough and to irradiate the light as reduced angle light, wherein the reduced angle light irradiated by the first micro-louver structure is narrower than the reduced angle light irradiated by the second micro-louver structure.

2. A vehicle compartment defining a lateral direction, the vehicle compartment comprising:

a first display configured to irradiate light towards a driver reference position within the vehicle compartment; and a first micro-louver structure disposed on the first display configured to reduce, in the lateral direction, an angle range of light from the first display passing therethrough and to irradiate reduced angle light, wherein the first micro-louver structure comprises:

a first portion disposed at a center of the first display configured to irradiate light passing therethrough as light having a first central axis in a first direction, and a second portion laterally offset from the center of the first display that irradiates the light passing therethrough as light having a second central axis in a second direction that is different from the first direction, wherein the first central axis and the second central axis are directed towards the driver reference position.

3. The vehicle compartment of claim 2, wherein the first direction is perpendicular to the first display.

4. The vehicle compartment of claim 2, wherein the second portion of the first micro- louver structure is disposed on an edge of the first display.

5. The vehicle compartment of claim 2, wherein the first micro-louver structure comprises a third portion that irradiates the light passing therethrough as light having a third central axis in a third direction that is different from the first direction and the second direction.

6. The vehicle compartment of claim 5, wherein the second portion of the first micro-louver structure is disposed on an edge of the first display, and the third portion of the first micro-louver structure is disposed between the first portion and the second portion on the first display.

7. The vehicle compartment of claim 1, wherein the first display is an instrument panel display, and the second display is an infotainment system display.

8. The vehicle compartment of claim 2, wherein the first display is an instrument panel display.

9. The vehicle compartment of claim 7, further comprising:

a driver side window, wherein the infotainment system display is configured to irradiate light towards both the driver reference position and a passenger reference position within the vehicle compartment, and wherein the second micro-louver structure is structured such that none of the reduced angle light irradiated thereby is incident on the driver side window.

10. The vehicle compartment of claim 1, further comprising a polarization structure formed on the first display.

11. The vehicle compartment of claim 10, wherein the polarization structure transmits horizontally polarized light while restricting vertically polarized light from passing therethrough.

12. The vehicle compartment of claim 1, further comprising:
a driver side window, and
an anti-reflective structure formed on the driver side window.

13. The vehicle compartment of claim 2, further comprising:
a driver side window, and
an anti-reflective structure formed on the driver side window.

14. The vehicle compartment of claim 1, further comprising:
a driver side window,
wherein the first micro-louver structure is structured such that none of the reduced angle light irradiated thereby is incident on the driver side window.

15. The vehicle compartment of claim 1, wherein the first display is configured to irradiate horizontally polarized light while not irradiating vertically polarized light.

16. The vehicle compartment of claim 2, further comprising:
a polarization structure disposed on the first display that transmits horizontally polarized light while restricting vertically polarized light from passing therethrough.

17. A vehicle comprising:
a dashboard; and
the vehicle compartment according to claim 1,
wherein the first display and the second display are disposed on the dashboard.

18. A vehicle comprising:
a dashboard; and
the vehicle compartment according to claim 2,
wherein the first display is disposed on the dashboard.

19. The vehicle of claim 17, wherein the vehicle compartment comprises a driver side window, and the first micro-louver structure is structured such that none of the reduced angle light irradiated thereby is incident on the driver side window.

20. The vehicle of claim 18, wherein the vehicle compartment comprises a driver side window, and the first micro-louver structure is structured such that none of the reduced angle light irradiated thereby is incident on the driver side window.

* * * * *